(12) United States Patent
Tibban

(10) Patent No.: US 7,476,318 B1
(45) Date of Patent: Jan. 13, 2009

(54) DRILLING MUD TANK

(76) Inventor: James A Tibban, 22371 Sioux Rd., Apple Valley, CA (US) 92308

(*) Notice: Subject to any disclaimer, the term of this patent is extended or adjusted under 35 U.S.C. 154(b) by 274 days.

(21) Appl. No.: 11/358,259

(22) Filed: Feb. 21, 2006

(51) Int. Cl.
*B01D 12/00* (2006.01)
*C09K 8/02* (2006.01)

(52) U.S. Cl. .............................. 210/532.1; 210/170.04; 210/255; 210/258; 210/259; 210/262; 175/66

(58) Field of Classification Search .................. 210/776, 210/800, 801, 803, 170.04, 189, 247, 264, 210/532.1, 542, 738, 708, 710, 711, 255, 210/258, 259, 262; 175/66
See application file for complete search history.

(56) References Cited

U.S. PATENT DOCUMENTS 2,756,965 A * 7/1956 Howe ............................ 175/66
3,737,037 A * 6/1973 Bone, III ........................ 175/66
4,865,751 A * 9/1989 Smisson ....................... 210/788
6,808,626 B2 * 10/2004 Kulbeth ........................ 210/804

* cited by examiner

*Primary Examiner*—Matthew O Savage
*Assistant Examiner*—Lucas Stelling
(74) *Attorney, Agent, or Firm*—Michael I Kroll

(57) ABSTRACT

A mud tank for processing drilling mud during drilling operations wherein the interior of the mud tank has sloping walls to guide sinking aggregate toward a sand trap disposed at the point of convergence thereof. The sand trap is comprised of the convergences area of the sloping walls and an inverted V-shaped cap member located thereabove along the entire length with ¼" gaps provided between the edges of the cap and their respective sloping walls. Aggregate is drawn through the gaps into the sand trap by a sand pump that provides a suction line therein. A center-divider within the mud tank separates the tank into a dirty tank and a clean tank to provide redundant cleaning operation for more effective removal of aggregate.

Figure 1:
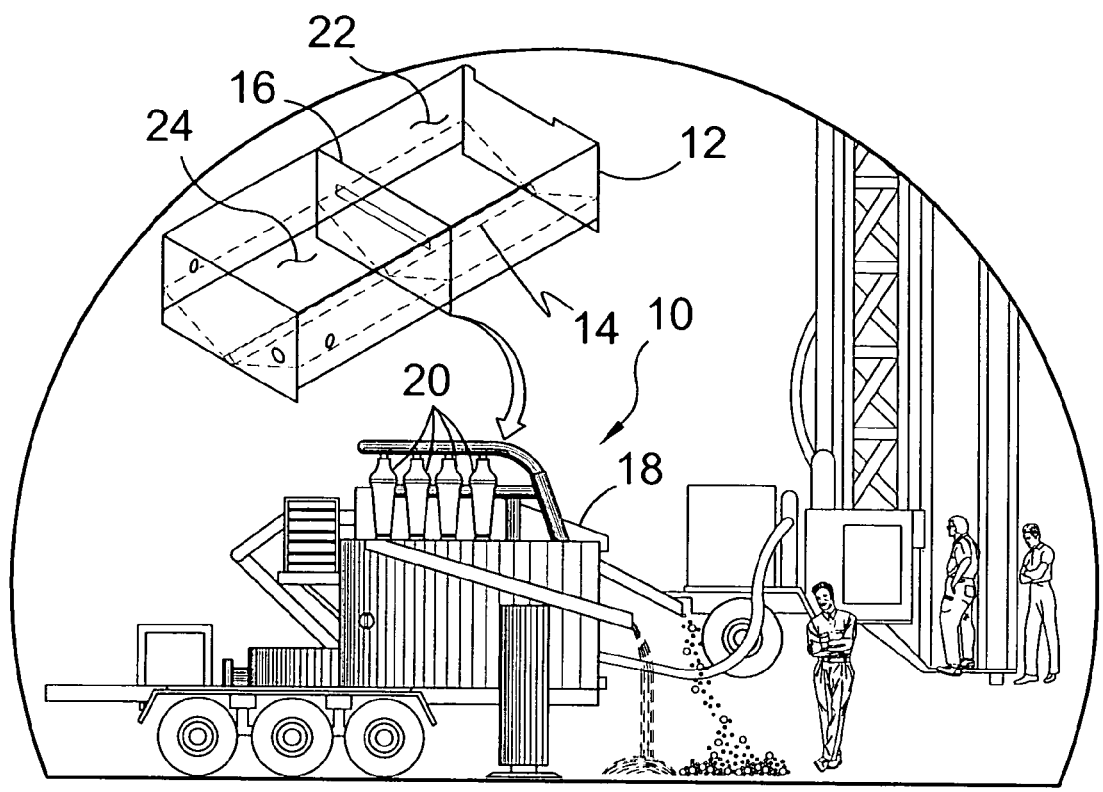

6 Claims, 10 Drawing Sheets

DRILLING MUD TANK

BACKGROUND OF THE INVENTION

1. Field of the Invention

The present invention relates generally to drilling mud and, more specifically, to a mud tank for processing drilling mud during drilling operations.

In drilling technology, drilling mud is used for removal of drill cuttings and to maintain hydrostatic equilibrium within the wellbore by pumping the drilling mud of a predetermined density down the drill string to the nozzles on the drill bit, whereupon the mud and cuttings are transported back up through the surface casing to a mud pit where it is screened to remove large particles and de-sanded prior to reuse.

The present invention provides a mud tank having a base with peripherally depending walls forming a receptacle for processing the wellbore aggregate by placing a screen shaker over the receptacle to remove particles larger than the screen mesh as the wellbore mixture is pumped into the receptacle. The receptacle is designed with divergent walls extending from a culvert spanning the length of the receptacle forming egress of the wellbore mixture for further processing.

Straddling the culvert is a cap, also having divergent walls extending from the cap apex with the cap divergent walls fixedly spaced away a predetermined distance from the receptacle divergent walls providing passage of the mud slurry into the culvert while preventing larger particles from entering. Preferably the spacing is approximately ¼ inch along both longitudinal cap edges.

Accordingly, the aggregate within the mixture hereinafter referred to as sand, will be channeled to the culvert and moved for further processing to the desander, as opposed to falling out of solution into the nooks and crannies of the prior art mud tanks requiring additional processing tasks.

Furthermore, the culvert cap prevents larger particles from impeding the flow to the desander having drain slits extending the length of both sides of the cap.

2. Description of the Prior Art

There are other tanks, which provide for fluid flow. While these tanks may be suitable for the purposes for which they where designed, they would not be as suitable for the purposes of the present invention as heretofore described.

It is thus desirable to provide a tank for processing drilling mud having means for channeling the wellbore mixture into a desander.

It is further desirable to provide said tank with a culvert having a cap thereover incorporating means for regulating particle size and to prevent blockage of the culvert flow.

SUMMARY OF THE PRESENT INVENTION

The present invention is a mud tank having a first and second compartment, each forming a tank with an aperture in the common wall separating the tanks serving as an overflow from one tank to the other.

All mud is drawn out of the front tank and all mud is deposited into the rear tank, which creates a flow from the rear tank to the front tank.

There are only two paths for mud to get to the front tank, both through the sand trap and through the overflow in the common wall forming a center divider.

Mud will take the path of least resistance, most often this is the sand trap at the bottom of the tank. This loads the sand trap pipe and forces the mud to flow from the rear tank to the front tank.

The desander pump draws a suction on the forward sand trap, which keeps the mud and sand moving to the desander pump with a small amount of mud flowing from the front tank into the sand trap. Because the mud from the shaker and desander cones is deposited into the rear tank, the rear tank will overflow through the center divider to the front tank. Now, mud in the front tank is clean with the desander cones continuously reprocessing the mud so that the mud in the front tank gets cleaner and cleaner. The suction point for the downhole pump is above the bottom of the tank there by clean mud is drawn off the top of the front mud tank.

A primary object of the present invention is to provide a drilling mud tank that prevents the accumulation of sediment within the mud tank.

Another object of the present invention is to provide a drilling mud tank having a base with walls depending therefrom with a substantially center partition dividing the tank into a first and second compartment with an aperture for passage of drilling mud therebetween.

Yet another object of the present invention is to provide a drilling mud tank having a longitudinal channel with walls divergently extending from a trough whereby sand will gravity feed into the channel.

Still yet another object of the present invention is to provide a drilling mud tank wherein said channel has a spaced apart cover with said space providing for the flow of mud and sand into the channel while preventing passage of larger particles.

Another object of the present invention is to provide a mud tank wherein said covered channel is in communication with a desander pump.

Yet another object of the present invention is to provide a mud tank having a port for supplying a source of clean drilling mud.

Still yet another object of the present invention is to provide a mud tank wherein said desanding process deposits cleaned mud and wellbore mud aggregate into a compartment in communication with a second compartment through a pair of passages.

Another object of the present invention is to provide a mud tank for processing drilling mud having a pair of tanks with a divider possessing an aperture for the mud to overflow from one compartment into the other.

Yet another object of the present invention is to provide a mud tank for processing drilling mud having a pair of tanks with a divider possessing an aperture positioned below the channel cap and extending to the channel walls forming passage to the desander cones via the desander pump.

Still yet another object of the present invention is to provide a mud tank that cycles all wellbore material in an efficient manner providing clean drilling mud at an economical cost.

Additional objects of the present invention will appear as the description proceeds.

The present invention overcomes the shortcomings of the prior art by providing a mud tank for processing drilling mud during drilling operations that overcomes the limitations of the prior art.

The present invention provides a mud tank having a base with peripherally depending walls forming a receptacle for processing the wellbore aggregate by placing a screen shaker over the receptacle to remove particles larger than the screen mesh as the wellbore mixture is pumped into the receptacle. The receptacle is designed with divergent walls extending from a culvert spanning the length of the receptacle forming egress of the wellbore mixture for further processing.

Straddling the culvert is a cap, also having divergent walls extending from the cap apex with the cap divergent walls fixedly spaced away a predetermined distance from the receptacle divergent walls providing passage of the mud slurry into the culvert while preventing larger particles from entering. Preferably the spacing is approximately ¼ inch along both longitudinal cap edges.

Accordingly, the sand within the mixture will be channeled to the culvert and moved for further processing to the desander, as opposed to falling out of solution into the nooks and crannies of the prior art mud tanks requiring additional processing tasks.

Furthermore, the culvert cap prevents larger particles from impeding the flow to the desander having drain slits extending the length of both sides of the cap.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
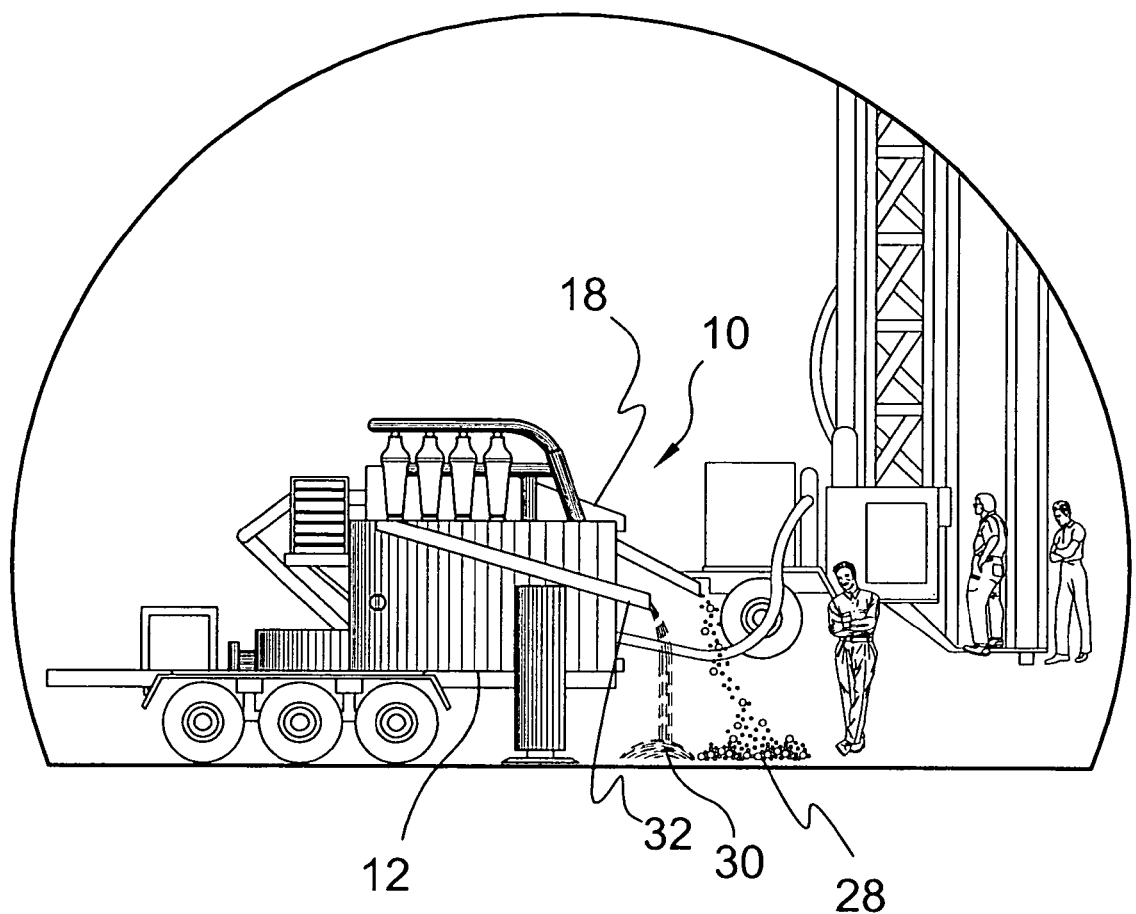
Figure 3:
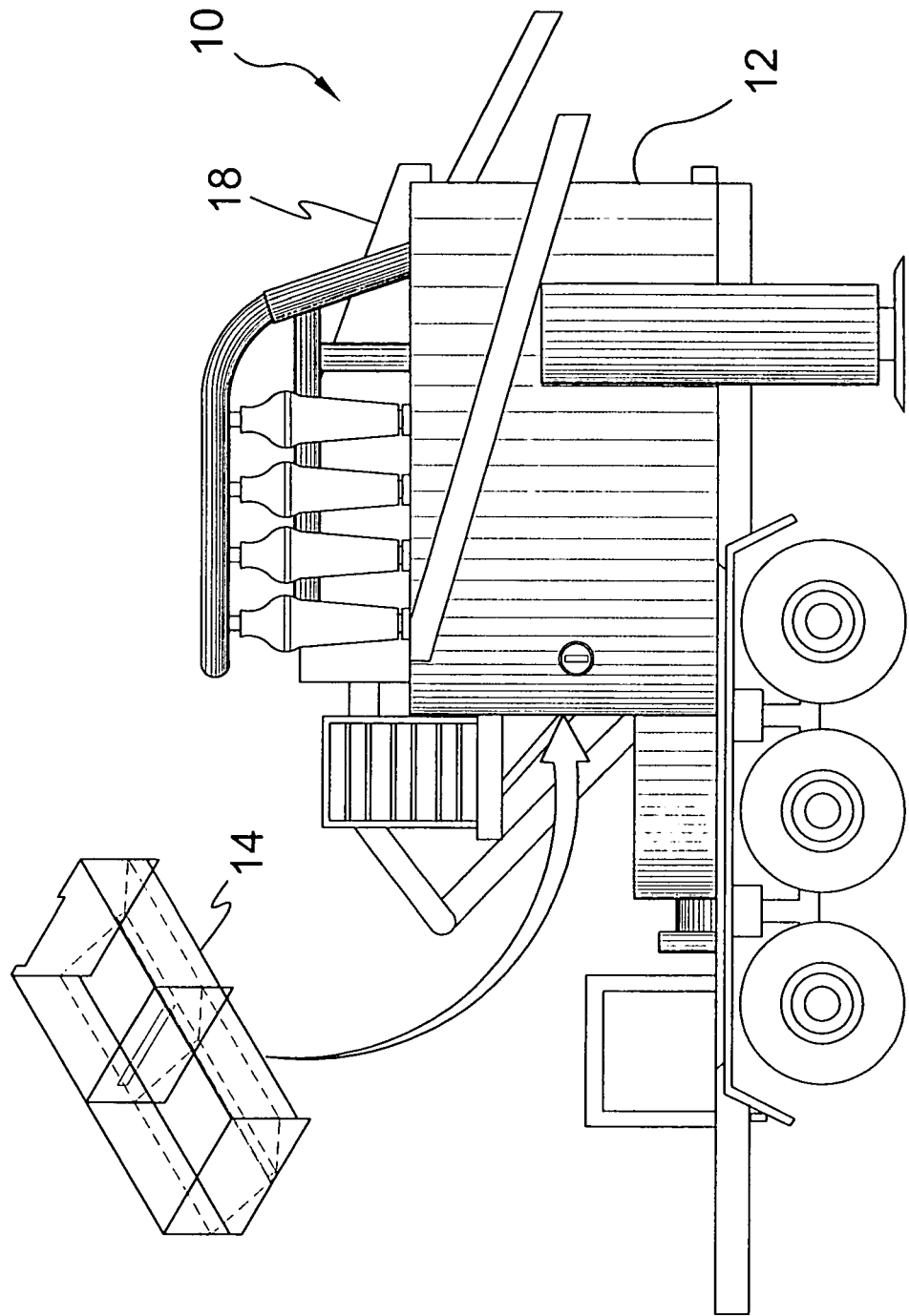
Figure 4:
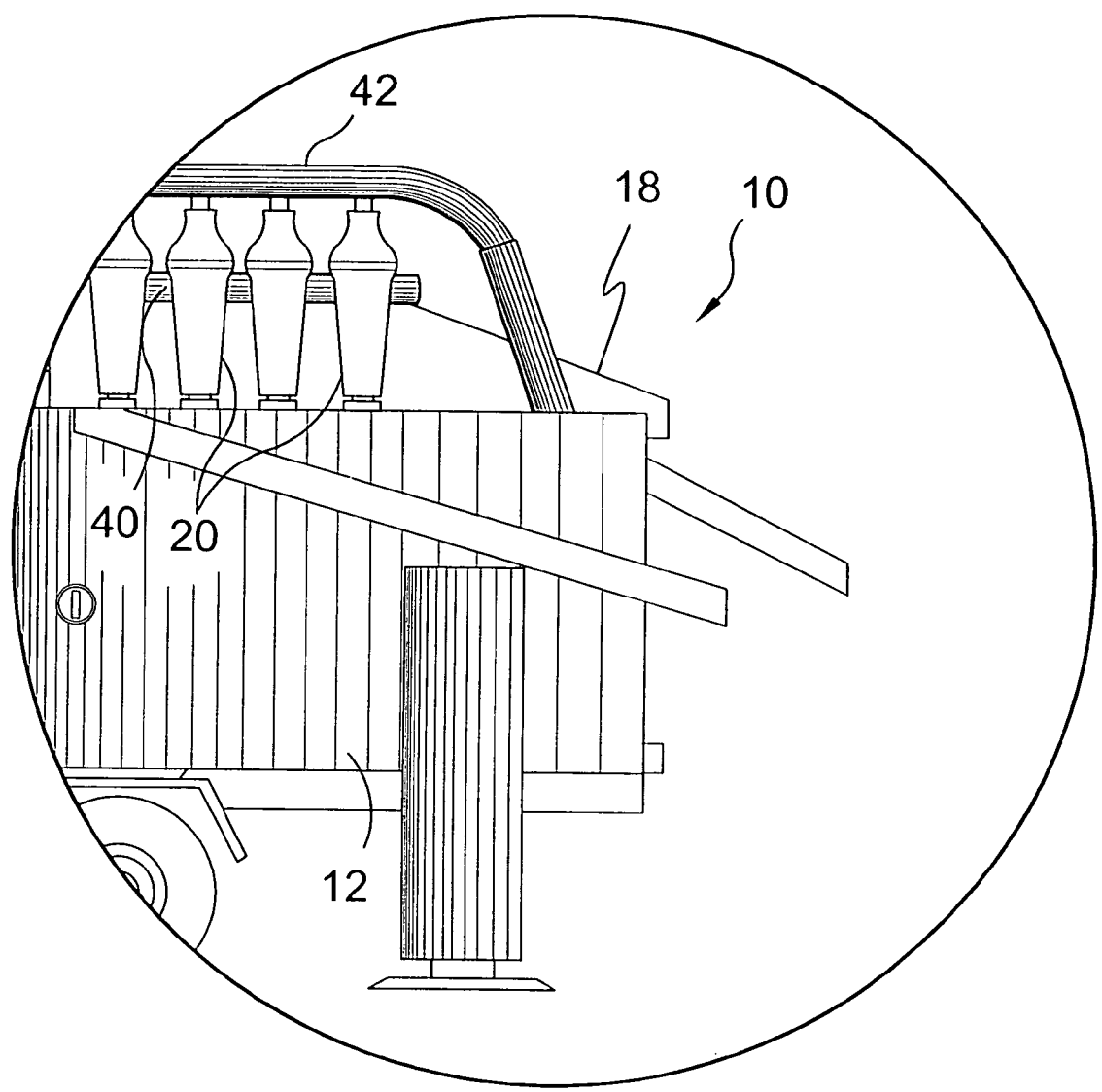
Figure 5:
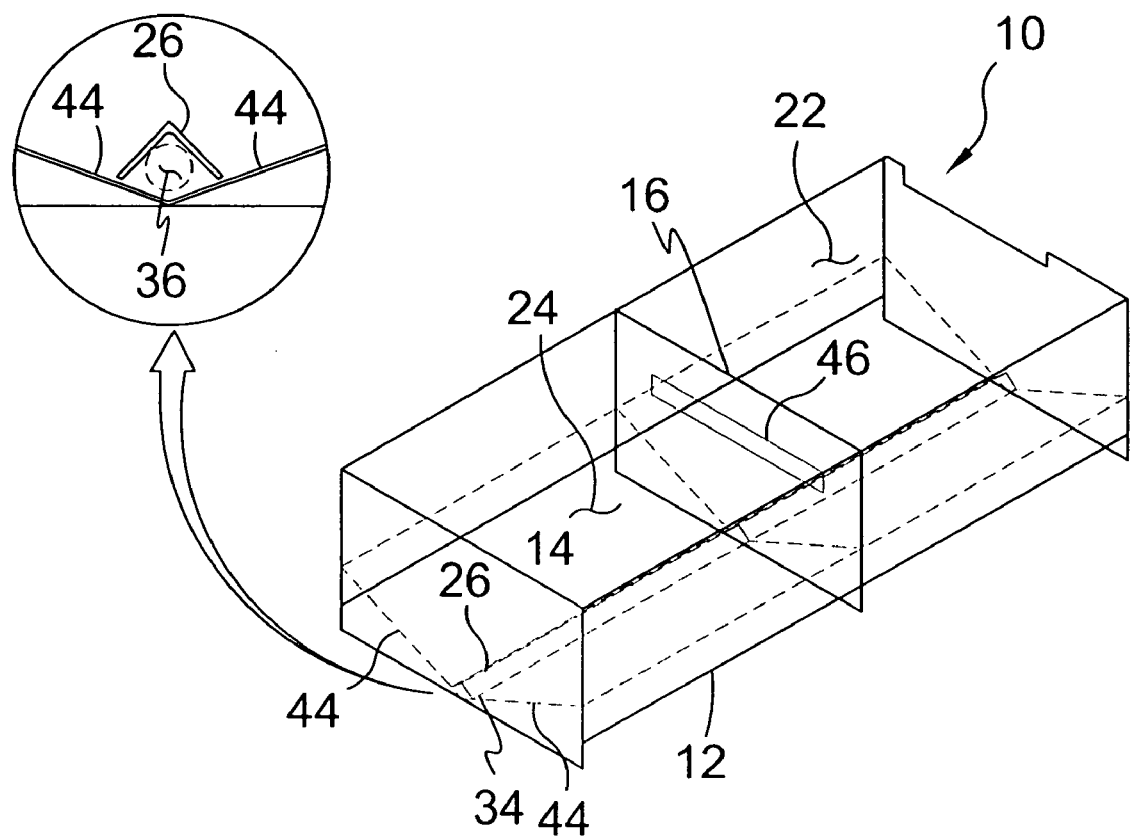
Figure 6:
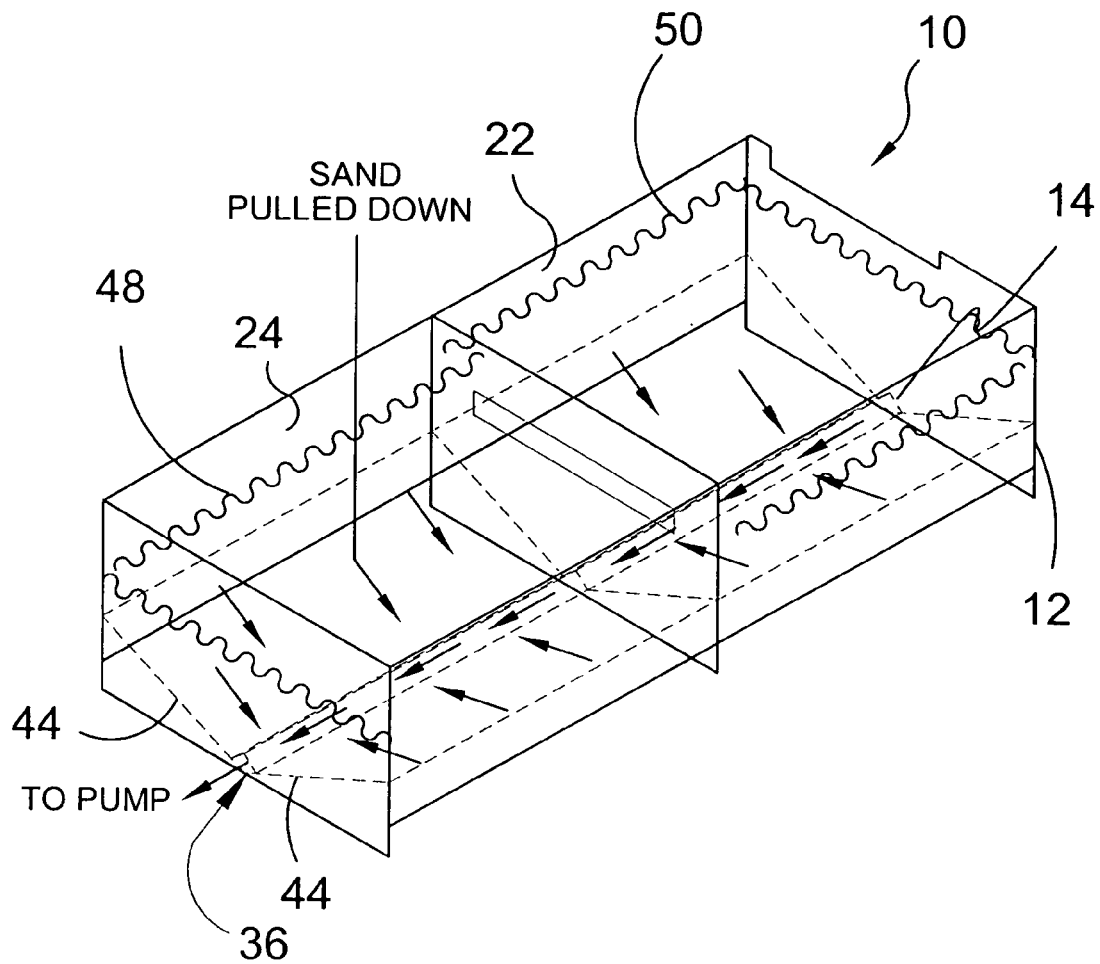
Figure 7:
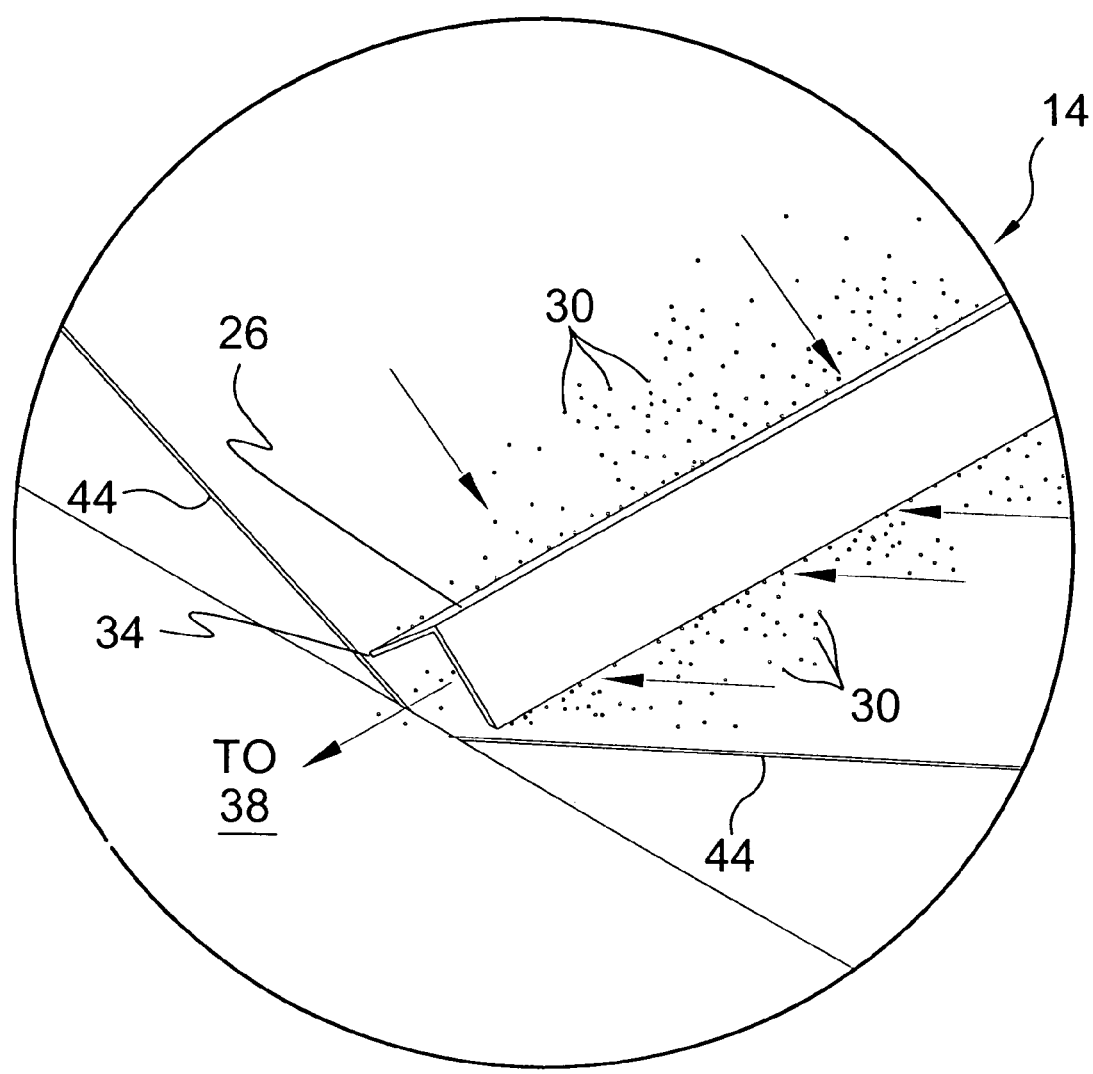
Figure 8:
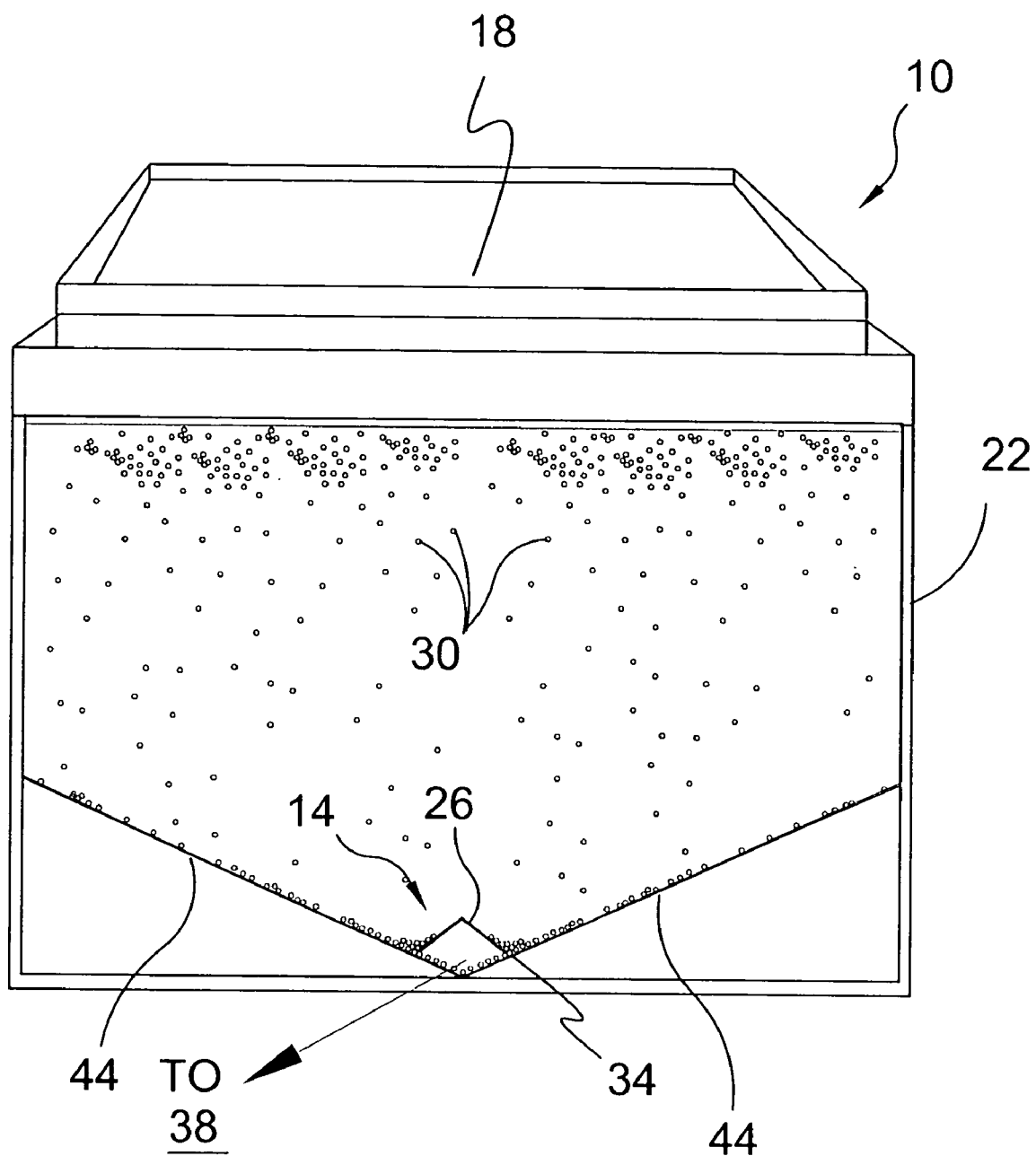
Figure 9:
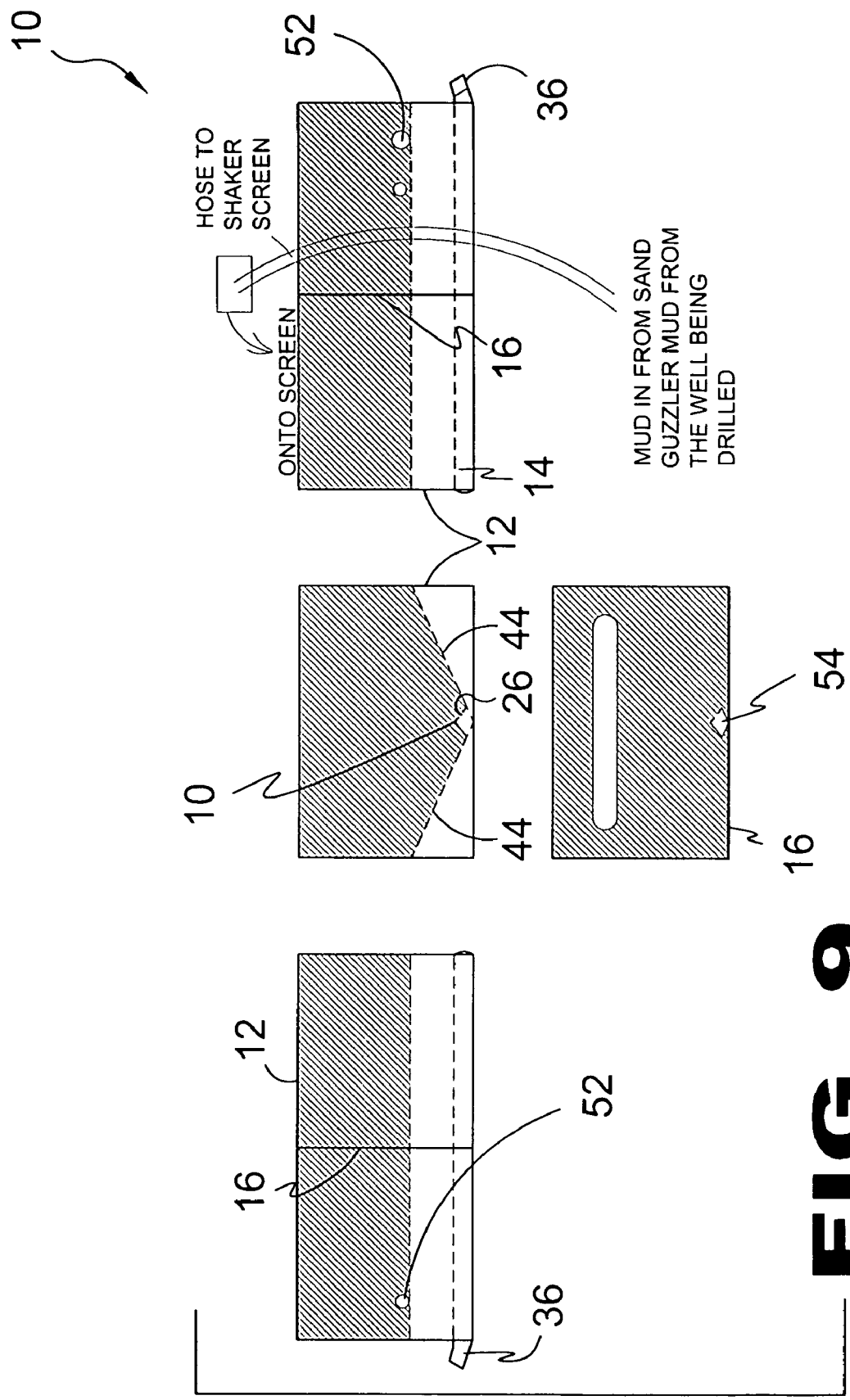
Figure 10:
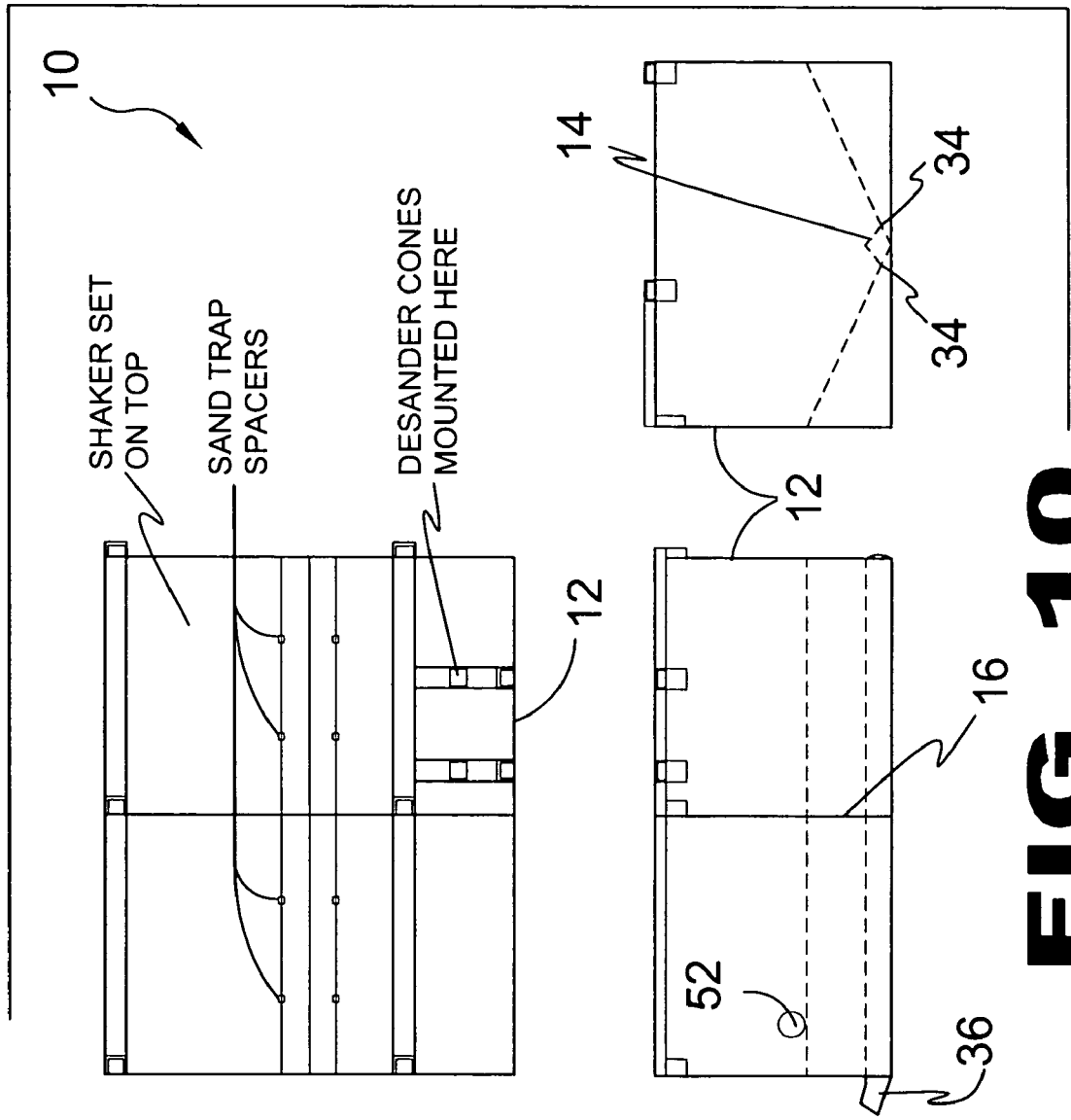

In order that the invention may be more fully understood, it will now be described, by way of example, with reference to the accompanying drawing in which:

FIG. 1 is an illustrative view of the present invention in use;
FIG. 2 is an illustrative view of the present invention in use;
FIG. 3 is a side view of the present invention;
FIG. 4 is an external view of the present invention in use;
FIG. 5 is a perspective view of the present invention;
FIG. 6 is a perspective view of the present invention;
FIG. 7 is a detailed view of the present invention in use;
FIG. 8 is a detailed view of the present invention in use;
FIG. 9 is orthographic views of the present invention; and
FIG. 10 is orthographic views of the present invention.

DESCRIPTION OF THE REFERENCED NUMERALS

Turning now descriptively to the drawings, in which similar reference characters denote similar elements throughout the several views, the figures illustrate the Improved Drilling Mud Tank Assembly of the present invention. With regard to the reference numerals used, the following numbering is used throughout the various drawing figures.

| | |
|---|---|
| 10 | Improved Drilling Mud Tank Assembly of the present invention |
| 12 | mud tank |
| 14 | sand trap assembly |
| 16 | center wall |
| 18 | shaker screen |
| 20 | desander cone |
| 22 | dirty tank of 12 |
| 24 | clean tank of 12 |
| 26 | cap of 14 |
| 28 | large debris |
| 30 | sand |

-continued

| | |
|---|---|
| 32 | sand dump chute |
| 34 | trap gap |
| 36 | suction port |
| 38 | desander pump |
| 40 | desander cone inlet |
| 42 | cone return line |
| 44 | sloped walls of 12 |
| 46 | overflow spillway |
| 48 | dirty mud |
| 50 | clean mud |
| 52 | extra outlet to drill |
| 54 | sand trap cutout |

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention 10 is a mud tank assembly 10 that is part of a mud cleaning system. The mud tank 12 serves as a reservoir for the mud that a well driller uses to drill with. The mud is a mixture of bentonite (clay) and water. The mud is pumped down the drill pipe while the well is being drilled. The mud comes out of the drill pipe at the bottom of the well and carries the rocks and sand from the bottom to the surface. The mud carrying the solids is pumped via the sand guzzler to a shaker 18 which is a vibrating screen that separates the rock and large items from the mud. The mud and sand fall through the screen into the mud tank. The large items fall onto the ground. The mud in the tank is then pumped through desander cones 20 that spin the mud so that the sand is thrown to the outside of a vortex. The clean mud leaves the top of the cone 20 and returns to the mud tank while the sand leaves the bottom of the cone 20 and falls to the ground. The mud tank assembly 10 includes the mud tank 12 divided interiorly into a rear dirty section 22 and a front clean section 24 by a center wall 16 and a sand trap assembly 14 covering the bottom of the tank 12.

FIG. 2 is an illustrative view of the present invention 10 in use. The mud tank 12 is a major part of the system. The mud carrying the sand falls from the shaker 18 into the dirty section of the tank 12. The tank 12 has sides that slope down toward the center. In the bottom of the tank 12, at the center is a sand trap formed by an inverted "V" cap welded to the bottom of the tank 12. There is a ¼" gap between the "V" sides of the cap that run the length of the tank 12 in both sections thus allowing the sand to be pulled into the trap gap. A desander pump draws mud from the tank 12 via the sand trap. Because there is a ¼" gap or opening in the sand trap, the sand is drawn in the entire length of the sand trap. That is how the inside of the tank 12 is kept clean. Large debris 28 is prevented entry into the dirty section of the mud tank 12 by the shaker 18 and the removed sand 30 is deposited by the sand dump chute FIG. 3 is a side view of the present invention 10. The present invention 10 provides a mud tank 12 that controls the flow of sand within by having sloped walls so sand is diverted into a suction and out to the desander pump. A sand trap runs along the bottom of the tank 12 that spreads the suction across the length thereof. The tank 12 is divided into two parts that separates the dirty mud from the clean mud. A shaker 18 is set over the dirty side and the clean mud is pumped back down the drill hole from the clean side.

FIG. 4 is an external view of the present invention 10 in use. The mud carrying the sand falls from the shaker 18 into the dirty section of the tank 12. The tank 12 has sides that slope down toward the center. In the bottom of the tank 12, at the center is a sand trap which is an inverted "V"-shaped trap cap welded to the bottom of the tank 12. There is a ¼" gap between the "V" sides that run the length of the tank 12 on both sides thus pulling the sand through the gap into the trap. A desander pump draws the sand from the sand trap through a suction port and it is delivered to the desander cones 20 via the desander cone inlet 44. The desander cones 20 create a vortex that propel the heavier sand particles outward while drawing the cleaned mud out of the top into the cone return line 42 and back into the mud tank 12 where it is reprocessed.

FIG. 5 is a perspective view of the present invention 10. Shown is a perspective view of the present invention 10 providing a tank 12 that controls the flow of sand within having a sand trap assembly 14 integral therewith including sloped walls 44 and the trap cap 26 at their juncture with a trap gap 34 therebetween through which sand is diverted therein and into a suction port 36 and out to the desander pump. The sand trap 14 runs along the bottom of the tank 12 and spreads the suction thereacross. The tank 14 is divided into two parts by a center wall 16 with an overflow spillway 46 that separates the dirty mud from the clean mud. A shaker is set over the dirty side 22 and the clean mud is pumped back down the drill hole from the clean side 24.

FIG. 6 is a perspective view of the present invention 10. Shown is a perspective view of the present invention 10 providing a tank 12 that controls the flow of sand within having sloped walls 44 so sand is diverted into a suction port 36 and out to the desander pump. A sand trap 14 runs along the bottom of the tank 12 that spreads the suction across the length thereof. The tank 12 is divided into two parts that separate the dirty mud 48 from the clean mud 50. A shaker is set over the dirty side 22 and the clean mud 50 is pumped back down the drill hole from the clean side 24. The dirty mud 50 in the dirty section 22 is high, therefore it will flow through the suction port 36 to the desander pump via the sand trap 14.

FIG. 7 is a detailed view of the sand trap 14 in use. The sand 30 sinks to the bottom of the dirty section 22 and is guided to the sand trap 14 by the sloped walls 44. The sand 30 enters the sand trap 14 through the gaps 34 between the walls 44 and the cap 26 and is subsequently drawn therethrough past the clean section to the desander pump 38.

FIG. 8 is a detailed view of the present invention 10 in use. Mud from drilling is dumped on the shaker screen 18 and the sand 30 sinks to the bottom of the dirty section 22 and is guided to the sand trap 14 by the sloped walls 44. The sand 30 enters the sand trap 14 through the gaps 34 between the walls 44 and the cap 26 and is subsequently drawn therethrough past the clean section to the desander pump 38.

FIG. 9 is a plurality of orthographic views of the mud tank 12 of the present invention 10. Shown are the primary components of the mud tank 12 including the suction port 36, the center divider 16, the extra outlet to the drill 52, the sand trap 14, the sand trap cutout 54 and the sloped walls 44 and cap 26 which define the sand trap 14.

FIG. 10 is a plurality of orthographic views of the present invention 10. Shown is the mud tank 12, the suction port 36, the extra outlet to drill 52, the center divider 16, the sand trap 14 and its gaps 34.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved mud tank assembly for processing drilling mud during drilling operations comprising:
    a) a mud tank comprising;
        i) a bottom;
        ii) vertical sidewalls extending peripherally from said bottom and end walls; and
        iii) a substantially open top;
    b) a sand trap extending centrally along said bottom of said mud tank between said end walls comprising:
        i) a pair of interiorly disposed sloping walls extending angularly from said sidewalls and converging with one another and coming together at a convergence line and closing off said bottom of said mud tank;
        ii) a cap member disposed above the line of convergence of said sloping walls and extending the entire length of said bottom of said mud tank forming an extended a passageway under said cap; and
        iii) a trap gap extending longitudinally between each edge of said cap and its respective sloping wall for entry of sand into said passageway;
    c) a suction port in one of said end walls in communication with said passageway for the removal of sand contained therein;
    d) a center divider disposed within said mud tank separating an interior thereof into a dirty tank section for depositing dirty mud for treatment and a clean tank section for retaining, recycling and distributing cleaned mud;
    e) a desander pump drawing mud containing said sand from said suction port;
    f) desander cones mounted above said dirty tank section for reprocessing dirty mud therein so that mud in said dirty tank gets cleaner and cleaner, and clean mud leaving tops of said desander cones is deposited into said clean tank section; and
    g) an overflow spillway in said center divider for allowing clean mud to flow into said clean front section from said dirty rear section, mud in the top portion of said dirty tank being relatively clean as a higher concentration of sand falls to a bottom portion of said tank.

2. The improved mud tank assembly as recited in claim 1, wherein said cap is an extended inverted V-shape to prevent the accumulation of falling aggregate thereon and to facilitate guiding the aggregate towards said trap gaps therebelow.

3. The improved mud tank assembly as recited in claim 2, wherein said gaps are approximately a distance of a ¼".

4. The improved mud tank assembly as recited in claim 2, having a shaker screen for receiving effluent mud removed during drilling to remove large objects therefrom thus allowing the rest of said effluent mud to travel therethrough into said dirty tank where sand sinks towards the bottom and is directed towards said sand trap by said sloping walls.

5. The improved mud tank assembly as recited in claim 4, wherein the mud and accumulated sand removed from said sand trap are transported by said sand pump to at least one desander cone wherein said desander cone creates a vortex further separating the sand from the mud, the sand being deposited from the bottom of said cone and delivered to an area outside of said mud tank and cleaned mud from said desander cone is redeposited into said dirty tank for recycled cleaning.

6. Apparatus for processing drilling mud during drilling operations comprising:
   a) a mud tank comprising a bottom, vertical sidewalls, vertical end walls, and a substantially open top, said tank divided into a dirty tank section and a clean tank section;
   b) a shaker screen for separating out rock and large items from said mud, said mud containing sand dropping into said dirty tank section;
   c) desander cones for spinning mud from said dirty tank section and delivering clean mud to said clean tank section;
   d) a sand trap in said tank extending centrally along said bottom of said mud tank between said end walls and through both said dirty and clean tank section;
   e) said sand trap comprising a pair of straight, sloping walls extending angularly from said sidewalls and converging with one another and coming together at a convergence line closing off said bottom of said mud tank, a cap member disposed above the line of convergence of said sloping walls and extending the entire length of said bottom of said mud tank forming an extended a passageway under said cap, said cap being a pair of sloping straight walls in the form of an extended inverted V-shape, and a trap gap extending longitudinally between a free edge of each straight wall and the respective sloping wall for entry of sand into said passageway;
   f) a suction port in an end wall adjacent said dirty tank section in communication with said passageway for the removal of sand contained therein so that sand flowing from dirty tank section passes said clean tank section;
   g) a desander pump drawing mud containing said sand from said suction port to said desander cones for reprocessing, and
   h) an overflow spillway in said center divider for allowing clean mud to flow into said clean tank section from said dirty tank section.

\* \* \* \* \*